(12) United States Patent
Weston et al.

(10) Patent No.: US 11,732,499 B2
(45) Date of Patent: Aug. 22, 2023

(54) GUIDE DEVICE AND METHOD FOR CONSTRUCTING A FENCE

(71) Applicant: Weston Fence Pty Limited, Hornsby (AU)

(72) Inventors: Frank Peter Weston, Hornsby (AU); Jeffrey Kirk, Hornsby (AU)

(73) Assignee: Weston Fence Pty Limited

( * ) Notice: Subject to any disclaimer, the term of this patent is extended or adjusted under 35 U.S.C. 154(b) by 383 days.

(21) Appl. No.: 16/336,425

(22) PCT Filed: Jun. 26, 2017

(86) PCT No.: PCT/AU2017/050652
§ 371 (c)(1),
(2) Date: Mar. 25, 2019

(87) PCT Pub. No.: WO2018/053575
PCT Pub. Date: Mar. 29, 2018

(65) Prior Publication Data
US 2019/0284835 A1  Sep. 19, 2019

(30) Foreign Application Priority Data
Sep. 26, 2016  (AU) .................................. 2016903893

(51) Int. Cl.
*E04H 17/26* (2006.01)
*B65H 57/16* (2006.01)
(Continued)

(52) U.S. Cl.
CPC ........... *E04H 17/261* (2013.01); *A01K 3/005* (2013.01); *B65H 57/14* (2013.01); *B65H 57/16* (2013.01); *B65H 2701/364* (2013.01); *B65H 2701/3912* (2013.01); *E04H 17/12* (2013.01); *E04H 17/127* (2021.01); *Y10T 29/49863* (2015.01)

(58) Field of Classification Search
CPC ..... E04H 17/127; E04H 17/26; E04H 17/261; E04H 17/266; E04H 17/12; B65H 2701/364; B65H 2701/3912; A01K 3/005
See application file for complete search history.

(56) References Cited

U.S. PATENT DOCUMENTS

| 3,934,655 | A | 1/1976 | Whistle |
| 6,065,714 | A | 5/2000 | Fondacaro |
| 2012/0112149 | A1 | 5/2012 | Tate |

FOREIGN PATENT DOCUMENTS

FR      2681627 A1 *  3/1993  ............. E04H 17/26

* cited by examiner

*Primary Examiner* — Matthew P Travers
(74) *Attorney, Agent, or Firm* — Morriss O'Bryant Compagni Cannon, PLLC.

(57) ABSTRACT

A guide device (10) is disclosed for constructing a wire or cable fence. The device (10) is arranged for contact with, and movement along, strands of pretensioned wire or cable (64) which form the fence wires. The guide device (10) has a number of rotatable members (16) on a generally horizontal axis of rotation, which are each arranged in use to support one of the strands (64) at a respective, pre-determined elevation above surrounding ground (8). A plurality of fence posts (66) having through-holes (68) that are arranged for receipt of the respective strand(s) (64) can then be caused to slide along the strands (64) in use without contacting the surrounding ground (8), and be spaced apart along those strands (64) to form the posts of the fence.

10 Claims, 6 Drawing Sheets

(51) Int. Cl.
  *A01K 3/00*   (2006.01)
  *B65H 57/14*  (2006.01)
  *E04H 17/12*  (2006.01)
  *E04H 17/02*  (2006.01)

GUIDE DEVICE AND METHOD FOR CONSTRUCTING A FENCE

TECHNICAL FIELD

This disclosure relates generally to the erection of fences and more particularly, but not exclusively, to electric fences suitable for use in the rural grazing and farming industries. The disclosure is also concerned with the features of equipment used for laying these fences as well as methods for optimising the construction of tensioned wire fences.

BACKGROUND OF THE DISCLOSURE

The erection of wire fences in rural areas can be a very labour-intensive operation. Fences are used to keep grazing animals in a property to prevent stock loss, and are also be used to prevent the ingress of feral animals, vermin and predators, especially when the fences are electrified.

Fences are usually required to extend over long distances, which makes it difficult to lay fences at a reasonable cost and in a safe manner, for example to avoid entanglement of wires. The prior art fence erection techniques usually involve hiring a team of persons to make use of a number of vehicles as well as specialist equipment to dig fence post holes in a line, followed by the laborious task of inserting and anchoring the fence posts, and then threading a number of elongate wires through respective spaced-apart holes which are located in those fence posts at various heights above the ground, to provide an animal barrier which is capable of electrification.

In another technique, it is known to lay out multiple elongate fence wires on the ground in parallel lines, and then to mechanically release a fence post which is threaded onto those wires through respective spaced-apart holes, so that adjacent fence posts are located a few metres apart from one another. However, following such a technique, a large number of fence posts then need to be simultaneously made to stand upright and be anchored to some sort of support to hold them upright, and then after that the wires need to be tensioned without entanglement. This can be a time-consuming task which also involves a lot of manhandling with the potential for back injury or pinching of fingers, and so on.

The rural environment can be harsh, and outdoor working conditions can be undesirable (heat, isolation, snakes, lack of access to medical facilities and shelter, and other dangers) over long period of time. There is a need for automation of the fence construction process to lower the costs of performing such a task, and to make the process faster.

SUMMARY

In a first aspect, embodiments are disclosed of a guide device for constructing a wire or cable fence, the device arranged for contact with, and movement along, one or more strands of wire or cable, the guide device having one or more member(s), the or each member being rotatable on a generally horizontal axis of rotation, and arranged in use to support one of the said strands at a respective, pre-determined elevation above surrounding ground, such that a fence post having one or more through-holes arranged for receipt of said strand(s) can be caused to slide along the said strand(s) in use without contacting the surrounding ground.

In certain embodiments, the guide device in use supports a plurality of strands in a spaced-apart manner.

In certain embodiments, the guide device comprises a column having a plurality of vertically spaced-apart members located thereon, each member arranged in use for support of a strand.

In certain embodiments, the movement of the guide device in use is by rolling along the strand. In one form of this, the members are wheels.

In certain embodiments, the location of the spaced-apart members with respect to one another is adjustable at the column.

In certain embodiments, the column is generally vertically oriented in use above the surrounding ground.

In certain embodiments, the guide device is arranged to be mounted on a vehicle.

In a second aspect, embodiments are disclosed of a method of constructing a wire or cable fence, the method comprising the sequential steps of: (i) tensioning one or more strands of wire or cable between two upright, ground-engaged support members located at opposing end regions of the strand(s); (ii) placing a guide device in contact with the one or more tensioned strands of wire or cable to support at least one of the said strands; (iii) moving the guide device in one direction along the strand(s) to raise the or each strand to a respective, pre-determined elevation above surrounding ground; and then (iv) causing a fence post having one or more through-holes therein to slide along the said raised strand(s), the or each through-hole being suitable for receipt of a respective strand; such that the fence post slides along said raised strand(s) without contacting the surrounding ground.

In certain embodiments, the method further comprises the action of lowering the strand(s) as the guide device moves further in the one direction, after sliding the fence post along the raised strand(s).

In certain embodiments, the method further comprises the step of adjusting the position of one or more support members which are located on the guide device, said adjustment step being made prior to placing the or each support member in contact with a respective strand. In one form of this, the step of adjusting the position of a plurality of support members involves locating them a predetermined distance apart from one another.

In certain embodiments, the method comprises the step of repeatedly sliding said fence posts along the strand(s) as the guide device is moved in the one direction, so that respective fence posts are arranged spaced apart from one another along the length of the strand(s).

In certain embodiments, the method further comprises the step of mounting the guide device on a vehicle, said mounting step being made prior to the step of moving the guide device.

In a third aspect, embodiments are disclosed of a method of constructing a wire or cable fence, the method comprising the steps of: calculating a predetermined number of fence posts required for the fence, said fence posts each having one or more through-holes arranged therein for receipt of a respective strand of wire or cable; aligning the said predetermined number of fence posts side by side, by locating one or more strands in respective through-holes; tensioning the or each strand between upright, ground-engaged support members located at opposing end regions of the strand(s); and then spacing out the fence posts by sliding them lengthwise along the tensioned strand(s), so as to become upright supports for the fence.

In certain embodiments, the step of spacing out the fence posts further comprises: placing a guide device in contact with said one or more strands to support at least one of the said strands; and moving the guide device in one direction along the strand(s) to raise the or each strand to a respective, pre-determined elevation above surrounding ground, such that the fence post slides along the strand(s) without contacting the surrounding ground.

In certain embodiments, the method steps of the third aspect are otherwise as defined by the method steps of the second aspect.

In a fourth aspect, embodiments are disclosed of a fence post having one or more through-holes arranged for in use sliding receipt of a respective strand of wire or cable, said fence post being provided for use with a device as defined in the first aspect, or a method as defined in either the second aspect or the third aspect.

In a fifth aspect, embodiments are disclosed of a method of constructing a wire or cable fence, the method comprising the steps of: (a) providing a fence post having one or more through-holes arranged for in use sliding receipt of a respective strand of wire or cable; and (b) following the method steps as defined in either the second aspect or the third aspect.

In a sixth aspect, embodiments are disclosed of a combination of a fence post having one or more through-holes arranged for in use sliding receipt of a respective strand of wire or cable, and the device as defined in the first aspect.

The use of an improved device for aiding the laying of fence posts, and an improved technique for construction of a tensioned wire fence has been found to produce many beneficial outcomes during its operation. These beneficial outcomes include a significant reduction in the time to construct a wire fence and, as a result, the cost of doing so (in some cases almost half of the cost of the known prior art technology). Also observed was a reduction in the difficulty of handling a large number of fence posts over long stretch of fence, with the present method having no requirement to upright hundreds of individually spaced-apart posts located along untensioned wires, followed by the complicated process of trying to tension the fence wires over that long distance.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments which will be described.

DETAILED DESCRIPTION

This disclosure relates to the features of a cable guide apparatus used for the construction of a tensioned wire or cable fence, as well as to a method of construction of a tensioned wire or cable fence. The cable guide has a design which enables a much faster fence laying operation than conventional techniques.

Referring to the drawings, FIG. 1 to FIG. 4 show a cable guide device 10 which comprises ten (10) spaced-apart pulley wheels 12 which are located in various positions along the length of an outermost front side wall 14 of a vertically-arranged column 16 comprising a square hollow section. The vertical orientation of the column 16 is with respect to the surrounding ground 8. Each pulley wheel 12 is rotatable about a respective shaft 18 which extends transversely across the depth of the square hollow section column 16, and each shaft 18 is aligned with one another, and has a generally horizontal axis of rotation.

Figures 1, 2:
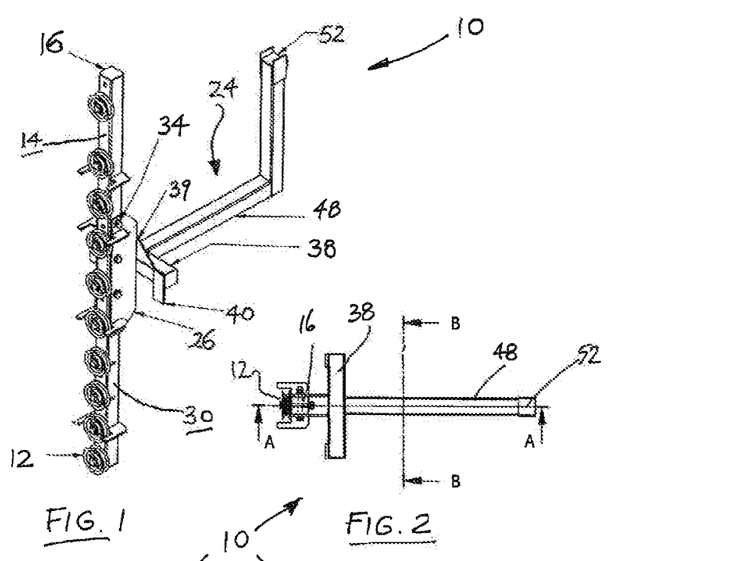
FIG. 1 is a perspective schematic view of a guide device in accordance with a first embodiment of the present disclosure.
FIG. 2 is a top plan schematic view of the guide device according to FIG. 1.
Figure 3:
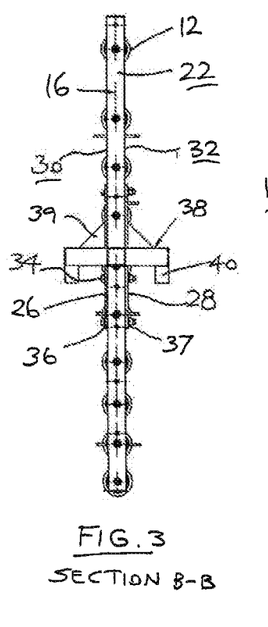
FIG. 3 is a schematic, cross-sectional end elevation view of the guide device according to FIG. 2, when viewed along sectional plane B-B.
Figure 4:
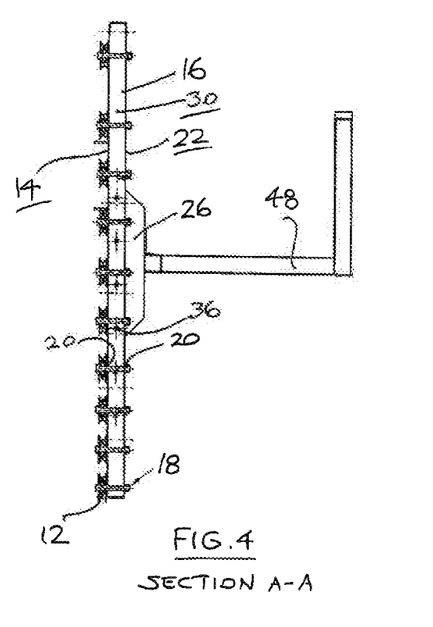
FIG. 4 is a schematic, cross-sectional side elevation view of the guide device according to FIG. 2, when viewed along sectional plane A-A.
Figure 5:
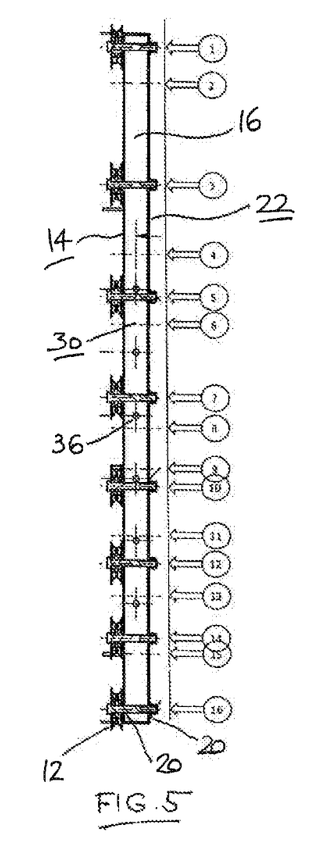
FIG. 5 is a schematic, cross-sectional side elevation view of the column portion of the guide device according to FIG. 1, when viewed along sectional plane A-A, and showing 16 possible locations for positioning rotatable members with generally horizontal axes of rotation.

In the embodiment shown, the square hollow section column 16 has a row of up to sixteen (16) pre-drilled through-holes 20 in various predetermined locations along the length of the outermost front side wall 14 (as well as in the opposing side wall 22 of the column 16) for accommodating the shafts 18 of the various pulley wheels 12 (as shown by the circled numbers shown in FIG. 5). The predetermined locations for positioning the pulley wheels 12 means that each wheel is able to support a separate wire of a tensioned wire fence at a respective, pre-determined elevation above surrounding ground 8, as well as being able to be used in the construction of fences with different numbers of wires, as will shortly be explained. By way of example, the embodiment shown in FIG. 5 comprises eight (8) spaced-apart pulley wheels 12 which are located in various positions along the length of the outermost front side wall 14 of the column 16.

The spacing of wires of a tensioned wire fence is determined as a matter of necessity by the landholder or farmer (for example, number and spacing of wires that will be used normally depends on the size and type of animals to be retained by the fence) and is typically from 3 up to 10 strands of wire. The position of the pulley wheels 12 is therefore easily adjustable by the operator of the cable guide device 10, by locating the respective rotatable shafts 18 in the pre-drilled through-holes 20 on the square hollow section column 16, so that the pulley wheels 12 are able to support the wires of the tensioned wire fence in use. As stated, FIG. 5 shows a configuration with eight pulley wheels (for an eight-wire fence construction). FIGS. 6 to 9 show a configuration with seven pulley wheels (for a seven-wire fence construction).

The square hollow section column 16 is retained at a base bracket 24 to form the cable guide device 10. The column 16 is supported at the base bracket 24 between a pair of brace plates 26, 28 which are located in a close-facing relationship with two opposing side walls 30, 32 of the square hollow section column 16. The column 16 is held in position between the brace plates 26, 28 by four bolts 34 which are located through four respective aligned holes 36, 37 arranged in each of the column side walls 30, 32 and aligned holes 31, 33 in each of the respective brace plates 26, 28 (each of the four sets of respective bolts 34, holes 36, 37 and holes 31, 33 are alike, and therefore have been given the same part number in the drawings, or are not separately numbered for reason of clarity). The column 16 can have a series of up to ten holes 36, 37, evenly spaced apart and arranged along the length each of the column side walls 30, 32, in use so that the column 16 can be arranged at different vertical heights with respect to the brace plates 26, 28 which form a part of the base bracket 24. This gives a user further flexibility to be able to regulate the overall height of the cable guide device, to provide an adjustment to compensate for different heights of vehicle above the surrounding ground 8. The bolts 34 are arranged in a transverse direction to the shafts 18 of the pulley wheels 12.

The remaining component parts of the base bracket 24 will now be described. The pair of brace plates 26, 28 is joined by a web 39 to a square hollow section cross-member 38 which has two welded shoulder plates 40, the cross member 38 being arranged in use for seating at the edge lip 42 of the tray top or flatbed base 44 of a utility truck 46, as shown in each of FIG. 6 to FIG. 9. The cross-member 38 is joined by welding to an L-shaped square hollow section 48 which provides a base support member used for mounting the cable guide device 10 to the truck 46. In use, a flexible strap 50 can be passed over and under the tray top or flatbed base 44 of the utility truck 46, and tensioned over the end cap seat 52 of the L-shaped square hollow section 48, and between the pair of brace plates 26, 28, in the manner shown in FIGS. 7, 8 and 9. Once the flexible strap 50 is tightened, this arrangement firmly anchors the cable guide device 10 to the truck 46, sufficiently to prevent it from sliding or twisting when subjected to use, when the pulley wheels 12 are supporting and rolling along various tensioned fence wires.

In other embodiments, the square hollow section column may be mounted to a base bracket of a different configuration which is suitable for mounting to a different vehicle type or design, for example. In other embodiments, the column may also be integrally formed with the base bracket, rather than being mounted or bolted to it. In further embodiments, the column itself can be of another configuration, for example a mesh grid at which the pulley wheels can be vertically mounted and arrayed at different heights and spacings from one another. The similar feature in all embodiments is that the location of the pulley wheels 12 is able to be adjusted to support separate wires of a tensioned wire fence at a respective, pre-determined elevation above surrounding ground 8.

Figures 6, 7:
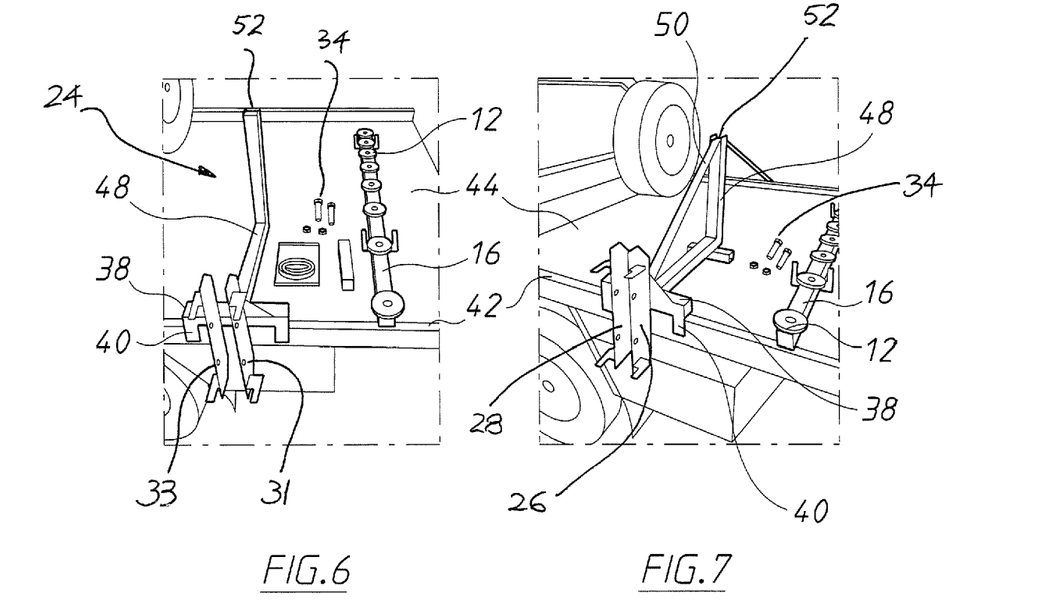
FIG. 6 is a perspective view of the main components of the guide device according to FIG. 1, including a main frame and a column for supporting rotatable members, the components not being joined together, but laid out on a flatbed rear tray of a vehicle.
FIG. 7 is a perspective, top view of the components of the guide device according to FIG. 6, showing the main frame now strapped onto the vehicle, and a column for supporting rotatable members, the components not being joined together.
Figure 8:
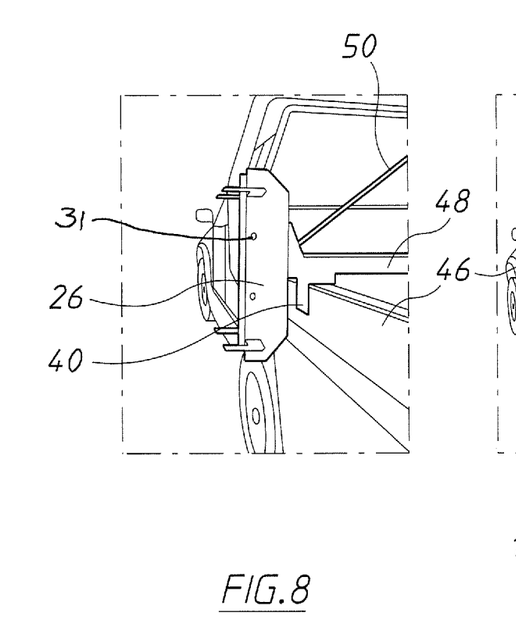
FIG. 8 is a perspective, end view of a part of the main frame according to FIG. 7, when strapped onto the vehicle.
Figure 9:
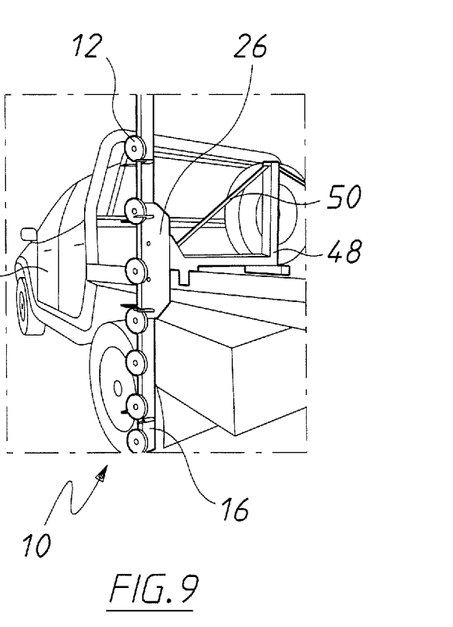
FIG. 9 is a perspective, end view of the components of the guide device according to FIG. 6, showing the main frame strapped to the vehicle and the column for supporting rotatable members, where the column is fitted to the main frame ready for use.
Figure 13:
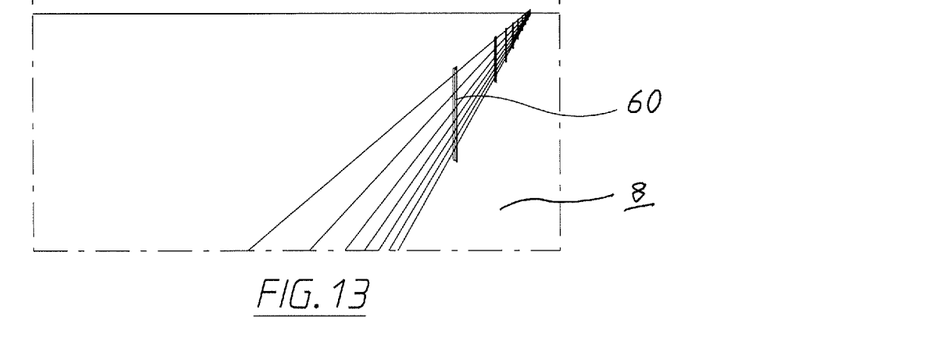
FIG. 13 is a perspective view of the tensioned fence wires extending from the ground-engaged fence post of FIG. 12, these wires forming the basis of an elongate fence, which is shown arranged in its final upright position, orthogonal to the surround ground.
Figure 16:
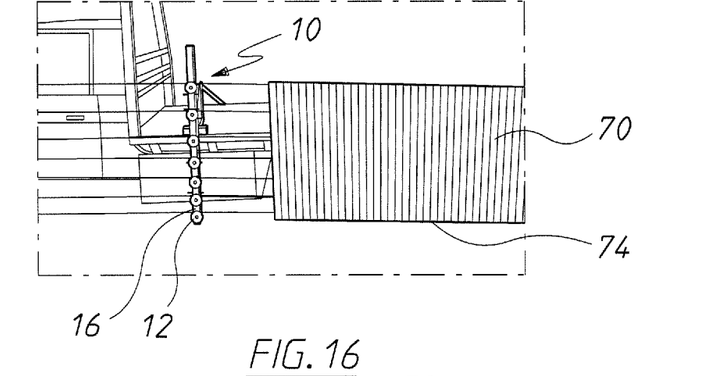
FIG. 16 is a side view showing the guide device of FIG. 1 when strapped to a vehicle, where the rotatable members are shown in use for supporting the tensioned fence wires that were shown in FIGS. 14 and 15, each of the tensioned wires being supported at an elevation at which the bundles of aligned fence posts are raised off the surrounding ground.
Figure 17:
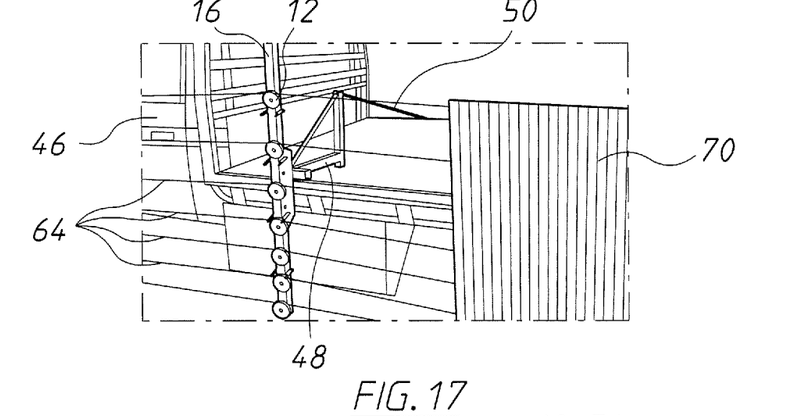
FIG. 17 is a partial side view showing portions of the vehicle, the guide device, the tensioned fence wires and a bundle of the aligned fence posts of FIG. 16.

In use, when the cable guide device is mounted to a vehicle (as shown in FIGS. 7 to 9, and in FIGS. 16 and 17, the pulley wheels 12 are arranged at a height on the square hollow section column 16 which can temporarily support and raise the tensioned fence wires in a position above the surrounding ground 8 to become somewhat elevated from their usual tensioned rest position forming a wire fence (the usual tensioned rest position being shown in FIG. 13, for example). The temporary elevation of a portion of the tensioned fence wires can occur all the way along the length of the wires during the movement of the vehicle 46 carrying the cable guide device 10, as the vehicle moves in a direction alongside and parallel to the fence line. This temporary elevation of the tensioned fence wires facilitates the ability of an operator to slidingly move fence posts therealong, as will now be described.

Figure 10:
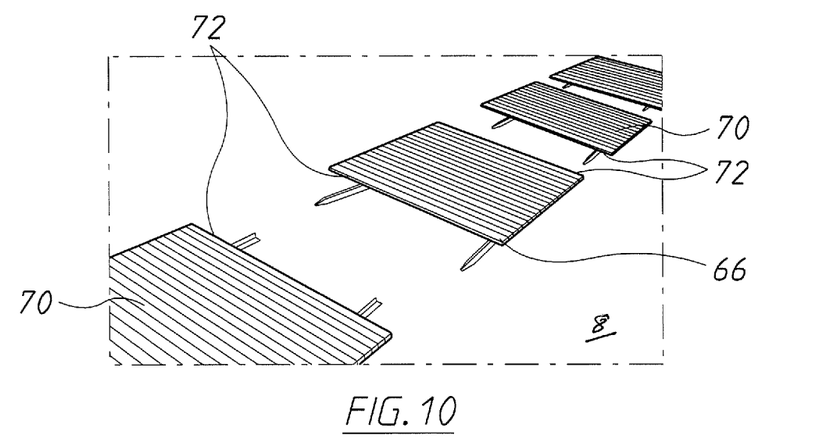
FIG. 10 is a perspective, partial view of four bundles of aligned fence posts laid out on the ground, with the elongate side of one bundle of fence posts facing the elongate side of the fence posts in an adjacent bundle.
Figure 11:
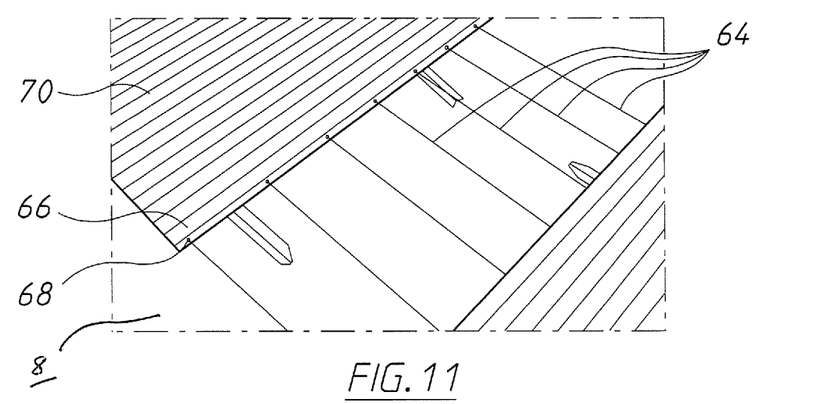
FIG. 11 is a top, partial view of two adjacent bundles of aligned fence posts laid out on the ground as shown in FIG. 10, with seven wires now threaded through corresponding, aligned through-holes in each fence post of each of the adjacent bundles.
Figure 12:
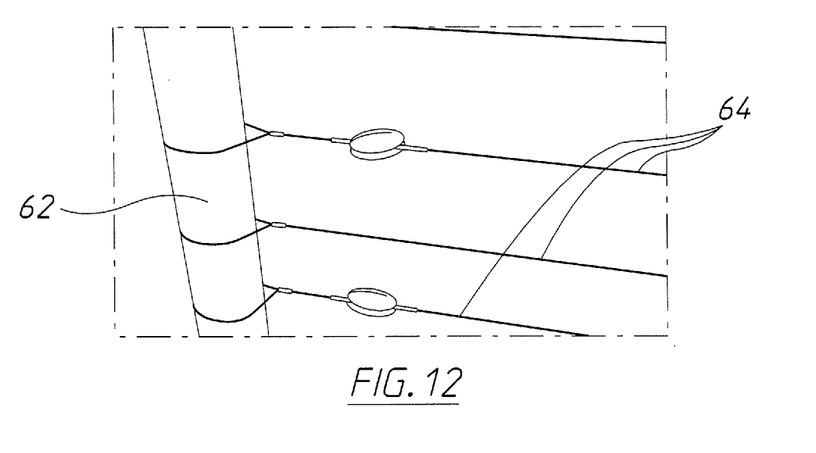
FIG. 12 is a perspective, partial view of a ground-engaged fence post at which the end region of the length of the wire(s) shown in FIG. 11 are tied to and tensioned thereat.
Figure 14:
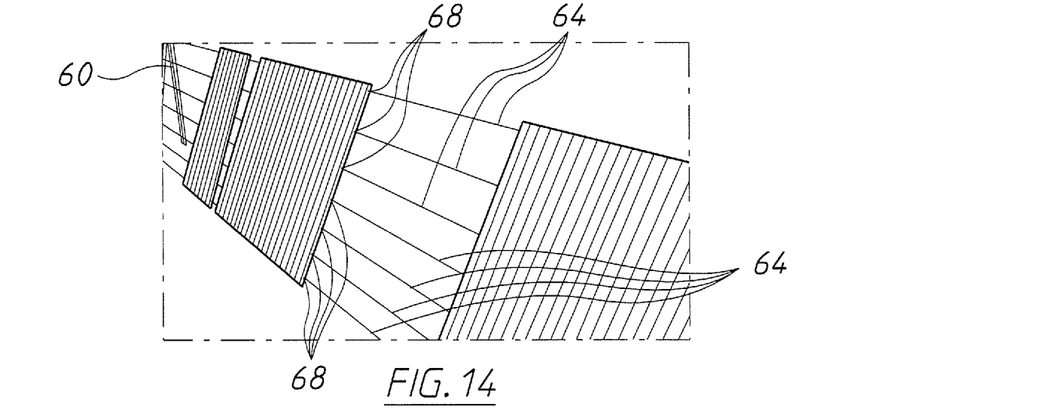
FIG. 14 is a perspective, partial view of the tensioned fence wires extending from the ground-engaged fence post of FIG. 12, with the bundles of aligned fence posts of FIG. 11 that were already threaded onto those wires now leaning upright.
Figure 15:
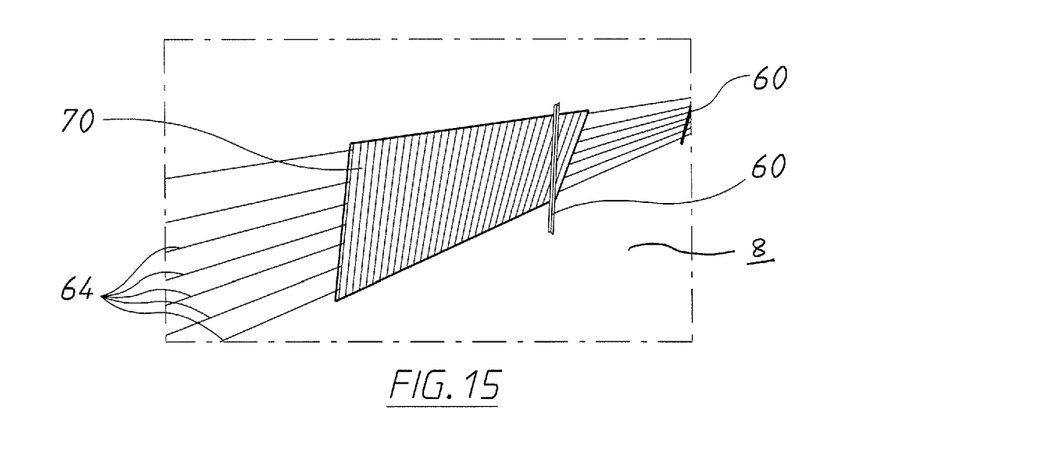
FIG. 15 is another perspective view of the tensioned fence wires extending from the ground-engaged fence post of FIG. 12, with one of the bundles of aligned fence posts of FIG. 11 that were already threaded onto those wires leaning upright.

Referring now to FIGS. 10 to 20, to construct a wire or cable fence, the general fence line to be followed is determined by placing a row of metal fence posts or star pickets 60 in a line, about 10 metres apart, and engaging these into the surrounding ground 8 (these can be seen in FIG. 14 and FIG. 15, for example). These will form the basis of the resulting fence, which may be several kilometres long. Ultimately the spacing of the star pickets 60 is determined by a farmer or landholder, and can be spaced apart by a larger amount, for example by 12 metres. At the opposing ends of this line of star pickets 60 are placed two upright, ground-engaged fence posts 62 which form the end anchor points for the wires 64 of the fence. These anchor points need to be firmly located in the ground, for example, concreted in position. The required number of fence wires 64 to form the fence, and the spacing apart of the wires 64 from one another, is determined by the landholder or farmer, and these wires are then tied off at one end anchor fence post 62, as shown in FIG. 12. After that, the wires 64 are then laid out along the ground 8, for the full distance to the other end anchor point, another fence post 62.

During the wire laying-out step, and before the fence wires 64 can be tensioned, they are threaded through a predetermined number of fence posts 66 which will be required as part of the finished, tensioned wire fence. Each of the fence posts 66 are thin, high-density polyethylene HDPE columns, each having a series of spaced-apart through-holes 68 formed along its length where each hole is wide 68 enough for receipt of a respective strand of wire or cable 64. The fence posts 66 are generally available and sold in strapped-together bundles 70 of aligned, parallel posts 66, with the through-holes 68 in each fence post 66 being aligned across the bundle 70 (for example, as shown in FIG. 10). The typical type of fence post employed in the construction of an electric fence is known as an insulated suspension post (ISP) or also as a 'dropper'. Instead of HDPE, the fence posts 66 can also be made of other lightweight, non-metallic insulating materials which are weatherproof, such as other types of plastic.

To construct the fence, a number of bundles 70 of these fence posts 66 are laid out on the surrounding ground 8 next to the notional line of the fence that will be constructed, the fence posts 66 being arranged orthogonal to the line of the fence, as shown in FIG. 10 which shows four such bundles 70 of fence posts 66. The elongate side 72 of one bundle 70 of fence posts 66 is arranged facing the like elongate side 72 of the fence posts 66 in an adjacent bundle 70.

The untensioned fence wires 64 are then threaded through the corresponding, aligned through-holes 68 in each fence post 66 of the bundles 70, for example seven wires 64 as shown in FIG. 11. The fence builder needs to calculate the exact number of fence posts 66 which will be required for the particular site job. The usual amount of fence posts is three for every 10 metres (or one spaced approximately every 3.3 metres), but again this will depend on the situation (it could be 4 metres of spacing, for example). This calculation will determine the number of bundles 70 (or individual fence posts 66) that are required to be threaded onto the fence wires 64 prior to tensioning.

Once the wires 64 are located in the respective through-holes 68 located in the predetermined number of fence posts 66, the wires 64 will then be fully tensioned by the operator to form the line of the fence. This means tying and tensioning each of the wires at the other end anchor fence post 62 of the fence. This step also requires moving the strapped-together bundles of fence posts 70, which are now threaded onto the tensioned fence wires 64, by tilting the bundles 70 at right angles upward to be orthogonal to the surrounding ground 8, and in an upright-leaning position as shown in FIGS. 14 and 15. Tensioned wire fences of this type can be constructed for any length, for example from 200 metres, to several kilometres, in length. It now remains for an operator to use the previously-described cable guide device 10 for spacing out the fence posts 66 by sliding them lengthwise along the tensioned wires 64, so as to become upright supports and spacers for the fence wires 64.

Figure 18:
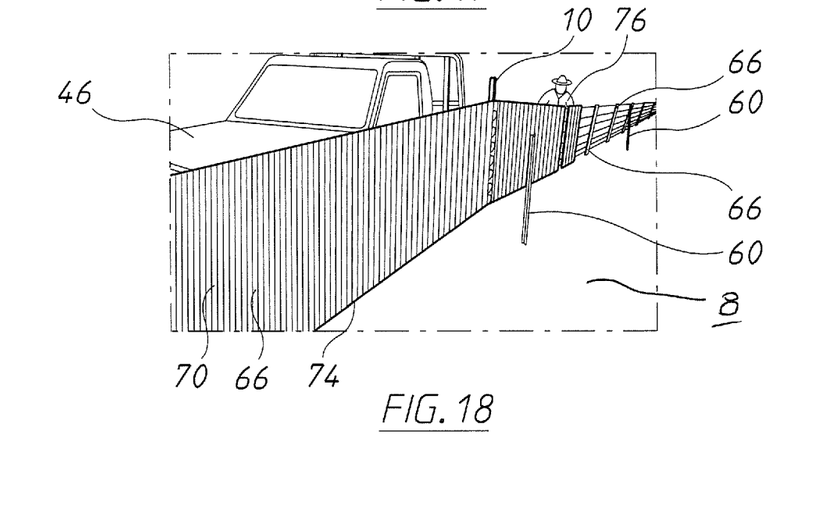
FIG. 18 is a further side, perspective view showing the guide device, the tensioned fence wires, and several of the bundles of aligned fence posts of FIG. 16, arranged such that during movement of the vehicle, the guide device allows sliding of the fence posts along the tensioned fence wires by the operator.
Figure 19:
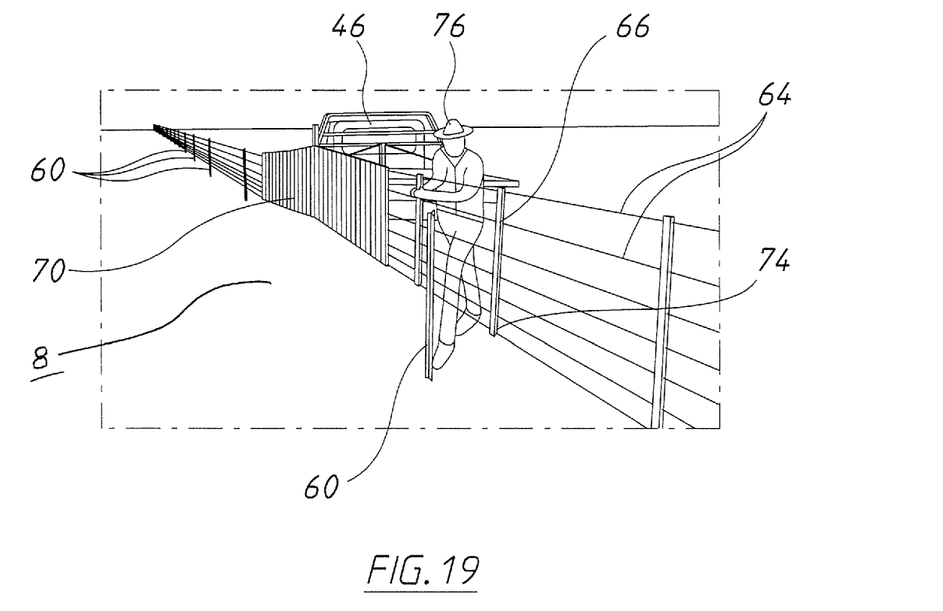
FIG. 19 is a further side, perspective view showing the guide device, the fence wires and the several bundles of aligned fence posts of FIG. 18 during movement of the vehicle, which allows sliding of the fence posts along the tensioned fence wires by the operator.
Figure 20:
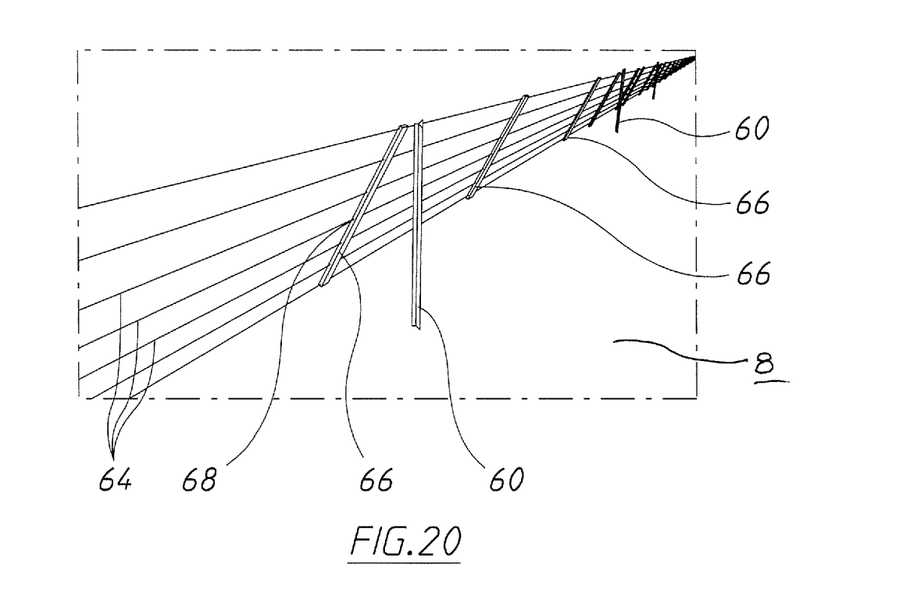
FIG. 20 is a perspective view of the tensioned fence wires having the fence posts shown distributed therealong, after use of the guide device in the manner shown in FIG. 18 and FIG. 19.

The step of spacing out the fence posts 66 involves placing the cable guide device 10 in contact with each of the tensioned fence wires 64 to temporarily support and raise the tensioned fence wires 64 in a position above the surrounding ground 8 to become somewhat elevated from their usual tensioned rest position, as shown in FIGS. 16 and 17. The utility truck 46 which is carrying the cable guide device 10 is driven parallel to the line of the fence, and progressively elevates a portion of the tensioned fence wires 64 along their length. The fence post bundles 70 are shown threaded and suspended on the tensioned wires 64 in FIGS. 16, 17, 18 and 19. The straps which hold the bundles 70 together are cut or removed. In FIGS. 18 and 19 in particular, it can be seen that, by lifting the tensioned wires 64, the cable guide device 10 also elevates the threaded, aligned fence posts 66 to a suspended clearance distance above the surrounding ground 8. This temporary elevation of the tensioned fence wires 64 facilitates the ability of an operator to slidingly move any number of fence posts 66 therealong without the lower end 74 of the post(s) 66 becoming engaged with the surrounding ground 8, as is more clearly shown in FIG. 18. The temporary elevation of the fence wires 64 and fence posts 66 extends at least 10 metres to the forward and to the rear of the position of the cable guide device 10.

Formation of the fence involves the repeated sliding of the fence posts 66 along the tensioned wires 64 during the forward motion direction of the vehicle 46. An operator 76 walking behind the vehicle 46 and keeping pace with it, manually grabs each fence post 66 individually and either holds it, or slides it rearwardly, to become spaced away from the remainder of what was a bundle 70 of fence posts 66 on the wires 64, causing the individual posts 66 to become spaced apart. In a sense, the operator is both (i) leaving a fence post 66 behind of what remains of the forwardly moving bundle(s) of fence posts, at a location of his choosing along the tensioned wires 64, and also (ii) manually controlling the forward motion of what remains of the bundle(s) of fence posts 66.

When the cable guide device 10 moves forward with the motion of the vehicle 46, and the fence posts 66 have been spaced apart along the wires 64 behind that vehicle 46, the wires 64 become lowered again as the guide device 10 moves further in the forward direction. This means that the lower end 74 of the posts 66 can become engaged with, or touch, the surrounding ground 8. The fence posts (or ISP or droppers) 66 may also not touch the surrounding ground, in some embodiments. These fence posts 66 provide alignment support for the tensioned fence wires 64, so they cannot become entangled, and because the posts 66 are made of an insulating material such as HDPE, if the fence wires are electrified, they will not short-circuit or earth-out. The fence posts 66 also provide visibility of the fence line itself, since fence wires 64 are often difficult to see until they are in close proximity. This is particularly important if the fence is to be electrified.

Once the fence posts 66 have been distributed along the wire 64, they can be clipped in position, if required. The ISP fence posts 66 left at the 10 metre points (which are adjacent to, and in alignment with, the ground-engaged metal fence posts or star pickets) will be clipped to the adjacent star pickets 60 to complete the formation and positioning of the final fence. Steps which can follow this may include the addition of electrification apparatus to the fence, used to repel animals and intruders.

The inventors have discovered from trial results using the new fence laying device and method that there is a significant increase in the rate of laying of fence as well a decrease in the cost involved, in comparison with the baseline case (without the new configuration). The known techniques can cost $3-4K per kilometre to install a tensioned wire fence, but the apparatus and method of the present disclosure can reduce that to around $1.5-2K per kilometre to install the same type of fence. The inventors have found that the fence described in the present disclosure can be completed at a rate at least twice as fast as the time taken to make a fence using known methods.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive. For example, the base bracket of the cable guide device may be joined to the column in various ways (for example, not just by nuts and bolts but by other types of fastening means). The roller and the column of the cable guide device can extend laterally further from the vehicle than is shown in the embodiments herein. The materials of construction of the cable guide device, whilst typically made of metal, can also be of other materials such as hard plastics or carbon fibre. The pulley wheels can comprise metal, elastomer, or ceramics, formed into the required shape.

Furthermore, the inventions have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A method of constructing a wire or cable fence, the method comprising the sequential steps of:
   (i) tensioning one or more strands of wire or cable between two upright, ground-engaged support members located at opposing end regions of the strand(s);
   (ii) placing a guide device in contact with the one or more tensioned strands of wire or cable, the guide device comprising one or more guide device members, each guide device member being rotatable on a generally horizontal axis of rotation, each member being arranged in use to support at least one of said strands;
   (iii) moving the guide device in one direction along the strand(s) between the ground-engaged support members to raise each strand to a respective, pre-determined elevation above surrounding ground; and then
   (iv) causing a fence post having one or more through-holes therein to slide along the raised strand(s), each through-hole being suitable for receipt of a respective strand;
   such that the fence post slides along said raised strand(s) without contacting the surrounding ground.

2. The method as claimed in claim 1, further comprising the action of lowering the strand(s) as the guide device moves further in the one direction, after sliding the fence post along the raised strand(s).

3. The method as claimed in claim 1, further comprising the step of adjusting the position of one or more of the guide device members which are located on the guide device, said adjustment step being made prior to placing each guide device member in contact with a respective strand.

4. The method as claimed in claim 3, wherein the step of adjusting the position of the one or more guide device members involves locating them a predetermined distance apart from one another.

5. The method as claimed in claim 1, comprising the step of repeatedly sliding further fence posts along the strand(s) as the guide device is moved in the one direction, so that respective fence posts are arranged spaced apart from one another along the length of the strand(s).

6. The method as claimed in claim 1, further comprising the step of mounting the guide device on a vehicle, said mounting step being made prior to the step of moving the guide device.

7. The method as claimed in claim 1, wherein the method further comprises the step of securing one or more of each of said fence posts to a previously ground-engaged post positioned in a predetermined line between the two upright, ground-engaged support members to which the strand(s) are tensioned.

8. A method of constructing a wire or cable fence, the method comprising the steps of:
   calculating a predetermined number of fence posts required for the construction of the fence, said fence posts each having one or more through-holes arranged therein for receipt of a respective strand of wire or cable;
   aligning the predetermined number of fence posts side by side, by locating one or more strands in respective through-holes;
   tensioning each strand between upright, ground-engaged support members located at opposing end regions of the strand(s); and then
   spacing out the fence posts by sliding them lengthwise along the tensioned strand(s), so as to become upright supports for the fence, by the steps of:
      placing a guide device in contact with said one or more strands, the guide device comprising one or more guide device members, each guide device member being rotatable on a generally horizontal axis of rotation, each guide device member being arranged in use to support at least one of said strands; and
      moving the guide device in one direction along the strand(s) between the ground-engaged support members to raise each strand to a respective, pre-determined elevation above surrounding ground, such that each of said fence posts slides along the strand(s) without contacting the surrounding ground.

9. The method as claimed in claim 8, wherein the method further comprises the action of lowering the strand(s) as the guide device moves further in the one direction, after sliding each of said fence posts along the raised strand(s).

10. The method as claimed in claim 8, wherein the method further comprises the step of securing one or more of each of said fence posts to a previously ground-engaged post positioned in a predetermined line between the two upright, ground-engaged support members to which the strand(s) are tensioned.

\* \* \* \* \*